(12) United States Patent
Boetzel

(10) Patent No.: US 6,377,541 B1
(45) Date of Patent: *Apr. 23, 2002

(54) METHOD AND APPARATUS FOR TRANSMITTING A CONTINUOUS DATA STREAM IN PACKETIZED FORM

(75) Inventor: Ulrich Boetzel, Kaarst (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,396

(22) Filed: Nov. 29, 1999

Related U.S. Application Data

(63) Continuation of application No. PCT/DE98/01052, filed on Apr. 14, 1998.

(30) Foreign Application Priority Data

May 28, 1997 (DE) .......................................... 197 22 433

(51) Int. Cl.[7] .................................................. H04L 1/00
(52) U.S. Cl. ........................ 370/216; 370/412; 714/748
(58) Field of Search ................................ 370/231, 216, 370/310, 321, 328, 412, 417, 418, 331, 473, 242; 455/422.3, 10, 74.1; 711/1, 108; 714/748, 750, 751, 800

(56) References Cited

U.S. PATENT DOCUMENTS

| 4,535,446 A | | 8/1985 | Mountain |
| 4,539,684 A | * | 9/1985 | Kloker ......................... 714/789 |
| 4,970,714 A | * | 11/1990 | Chen et al. .................. 370/216 |
| 5,228,032 A | | 7/1993 | Mertelmeier et al. |
| 5,375,119 A | | 12/1994 | Koivu |
| 5,416,778 A | * | 5/1995 | Chan et al. ................. 370/95.1 |
| 5,666,484 A | * | 9/1997 | Orimo et al. ................. 714/18 |
| 5,732,356 A | * | 3/1998 | Bolt ........................... 455/462 |
| 5,754,754 A | * | 5/1998 | Dudley et al. ................ 714/18 |

FOREIGN PATENT DOCUMENTS

| DE | 3235243 A1 | 3/1984 |
| EP | 0712218 A1 | 5/1996 |

OTHER PUBLICATIONS

"Cordless Access to the ISDN Basic Rate Service" (Hing et al.), U.K. Teletraffic Symposium, Jan. 1, 1993, pp. 29.01–29.07.

\* cited by examiner

Primary Examiner—David R. Vincent
(74) Attorney, Agent, or Firm—Herbert L. Lerner; Laurence A. Greenberg; Werner H. Stemer

(57) ABSTRACT

A method and an apparatus for transmitting a continuous data stream in packetized form include a storage device in which the data can be temporarily stored for specific times before and after their transmission. The data are temporarily stored in a cyclic buffer. Therefore, the complexity to be accepted for error-free data transmission can be minimized.

4 Claims, 4 Drawing Sheets

METHOD AND APPARATUS FOR TRANSMITTING A CONTINUOUS DATA STREAM IN PACKETIZED FORM

CROSS-REFERENCE TO RELATED APPLICATION

This application is a continuation of copending International Application No. PCT/DE98/01052, filed Apr. 14, 1998, which designated the United States.

BACKGROUND OF THE INVENTION

FIELD OF THE INVENTION

The present invention relates to a method as well as to an apparatus for transmitting a continuous data stream in packetized form using a storage device in which the data can be temporarily stored for specific times before and after their transmission.

Such a method and such an apparatus are required, for example but in no way exclusively, in radio systems operating by using the DECT Standard.

However, considerable complexity is required in order to make it possible to ensure that there are no errors in the data transmission.

SUMMARY OF THE INVENTION

It is accordingly an object of the invention to provide a method and an apparatus for transmitting a continuous data stream in packetized form, which overcome the hereinafore-mentioned disadvantages of the heretofore-known methods and apparatuses of this general type in such a way that the complexity which must be accepted in order to be able to ensure that a data transmission is free of errors is kept at as low a level as possible.

With the foregoing and other objects in view there is provided, in accordance with the invention, a method for transmitting a continuous data stream in packetized form using a storage device for temporarily storing the data for specific times before and after transmission of the data, which comprises temporarily storing data of data packets in a cyclic buffer; and temporarily storing addresses, starting with which the data are stored in the cyclic buffer, in read-pointer temporary storage devices.

In accordance with another mode of the invention, there is provided a method which comprises reading the data to be transmitted from the cyclic buffer immediately before transmission of the data, and preparing the data for transmission together with signaling and error protection data in a transmission buffer.

In accordance with a further mode of the invention, data packets which are not transmitted without any errors are transmitted once again.

In accordance with an added mode of the invention, there is provided a method which comprises supplying a start address, from which the data to be transmitted can be read from the cyclic buffer, from a read-pointer temporary storage device, at least when the data are transmitted once again.

With the objects of the invention in view there is also provided an apparatus for transmitting a continuous data stream in packetized form, comprising a storage device for temporarily storing data in data packets for specific times before and after transmission of the data, the storage device being or containing a cyclic buffer; and a multiplicity of read-pointer temporary storage devices for storing addresses starting with which the data stored in the cyclic buffer are stored.

The replacement of the FIFO storage which is normally used for temporary storage with a cyclic buffer makes it possible to dispense with the provision of transmission repetition temporary storage devices. In contrast to the situation with FIFO storage devices, the data which may need to be transmitted once again may be read at any desired times and as often as desired from any desired points within the cyclic buffer.

Apart from this, the operation of the cyclic buffer is simpler and less problematic than that of a FIFO storage device. Specifically, in contrast to the situation in which a FIFO storage device is used, the use of a cyclic buffer means that it is unnecessary to shift or store the stored data once again continuously internally. As a result, the cyclic buffer has been found to be the considerably better variant both in terms of power consumption and in terms of temperature response.

It is thus possible, by using the method according to the invention and the apparatus according to the invention, to reduce to a minimum the complexity which has to be accepted in order to be able to ensure that the data transmission is free of errors.

Other features which are considered as characteristic for the invention are set forth in the appended claims.

Although the invention is illustrated and described herein as embodied in a method and an apparatus for transmitting a continuous data stream in packetized form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
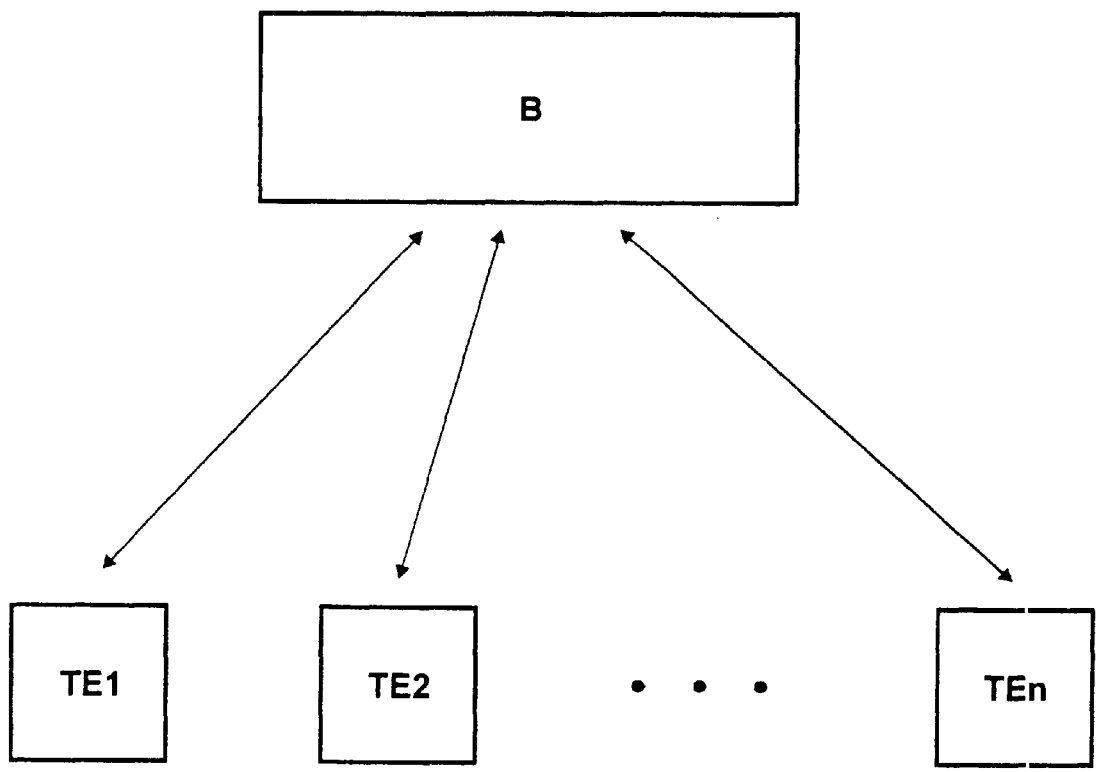
FIG. 2 is a block diagram showing a structure of a radio system which operates by using the DECT Standard.

Referring now to the figures of the drawings in detail and first, particularly, to FIG. 2 thereof, there is seen a basic structure of a radio system which operates by using a DECT Standard.

The system shown in FIG. 2 includes a base station B and a plurality of cordless telecommunications terminals TE1 to TEn. The cordless telecommunications terminals TE1 to Ten are, for example, mobile telephones which are able to communicate with the base station B by radio. Cordless connecting sockets for the connection of telecommunication terminals with cords (socalled "normal" telephones, fax machines, modems, etc.) may also be used instead of the cordless telecommunications terminals.

Data are transmitted between the base station B and the telecommunications terminals TE1, TE2, ... TEn (or other devices) in units of so-called frames. This process will be explained in the following text with reference to FIG. 3, to the extent required for the present purpose. As can be seen from FIG. 3, such a frame, to be more precise a DECT full slot frame considered herein, is composed of 24 so-called time slots or slots (full slots). The first 12 of the 24 slots are transmitted from the base station to the telecommunications terminals, and the second 12 slots following these are transmitted from the telecommunications terminals to the base station. To be more precise, the zeroth slot in each frame is transmitted from the base station to a zeroth telecommunications terminal, the first slot is transmitted from the base station to a first telecommunications terminal, the second slot is transmitted from the base station to a second telecommunications terminal, . . . , and the eleventh slot is transmitted from the base station to an eleventh telecommunications device. Conversely, the twelfth slot is transmitted from the zeroth telecommunications terminal to the base station, the thirteenth slot is transmitted from the first telecommunications terminal to the base station, the fourteenth slot is transmitted from the second telecommunications terminal to the base station, . . . and the twenty-third slot is transmitted from the eleventh telecommunications terminal to the base station.

A frame, or the 24 slots of a frame, is/are transmitted within 10 ms. Each slot includes 480 bits and is transmitted in around 417 $\mu$s (in 416.66 $\mu$s). As can be seen from FIG. 3, the 480 bits are distributed over a 32 bit-wide sync field, a 388 bit-wide D field, a 4 bit-wide Z field, and 56 bit-wide guard space field. 320 bits are reserved within the D field for transmission of the wanted data (for example voice data) which are actually of interest. The base station can thus transmit 320 bits of wanted data to each of the telecommunications terminals, and can receive the same amount of wanted data from each of the telecommunications terminals within 10 ms. The transmission rate for wanted data between the base station and each of the telecommunications terminals is thus 32 kbit/s in each direction.

If the base station B is connected to the ISDN telecommunications network, then it can receive wanted data from this network, and feed into this network, at a transmission rate of 64 kbit/s.

With the system explained above, the wanted data transmission rate between the base station and the ISDN telecommunications network is thus twice as great as the wanted data transmission rate between the base station and the connected telecommunications terminals. The connection of a radio system operating by using the DECT Standard to the ISDN telecommunications network thus requires the provision of special measures: either the data to be transmitted are transmitted in depressed form between the base station and the telecommunications terminals, or the data to be transmitted between the base station and the telecommunications terminals are transmitted in a different way than that described above.

If the data to be transferred are voice data, then it is possible to transmit such data in compressed form between the base station and the telecommunications terminals. Although this results in information losses, as a rule these are tolerable.

If, on the other hand, the data to be transferred include data other than voice data, that is to say, for example, data sent from a computer, fax machine, modem or the like, then such data may be so corrupted by the compression process as to become unusable. In cases such as those, the data to be transmitted must therefore also be transmitted at a rate of 64 kbit/s between the base station and the telecommunications terminals.

One option for achieving this is to use the so-called LU7 service.

The LU7 service is used to transmit a continuous 64 kbit/s data stream in packetized form through the so-called MAC layer of DECT (Layer 2 in accordance with the OSI/ISO layer model), and is defined in ETSI Document ETS 300 175-4, which relates to the so-called DLC layer of DECT (Layer 3 in accordance with the OSI/ISO layer model).

The increase in the data transmission rate to 64 kbit/s is made possible when using so-called double slots.

As the term itself indicates, double slots are twice as long as the "normal" full slots, and thus include 960 bits. In this case the 480 bits to be added to a full slot are not distributed, for example, over all of the fields in the full slot, but are added exclusively to that section of the D field which contains the wanted data to be transmitted. Consequently, 320+480=800 bits are transmitted per double slot. Of these 800 bits 80 bits are reserved for error protection data for error identification and error correction (FEC or Forward Error Correction), so that 720 bits are available per double slot for pure wanted data transmission.

The use of double slots does not change the length of a frame. It is only the number of slots which are contained in a frame, that is to say the number of appliances which can be registered with a base station, that consequently changes.

When double slots are used to transmit data between the base station and the appliances connected to it, it is thus possible to transmit 720 bits, that is to say 72 kbit/s in both directions, every 10 ms (duration of a frame). This is even more than the desired 64 kbit/s.

Packetized transmission of a continuous data stream requires the provision of a storage device at the transmission and receiving ends. In that device the data to be transmitted can be temporarily stored for specific times before and after their transmission. A so-called FIFO (first-in-first-out) storage device is normally used for this purpose.

Figure 4:
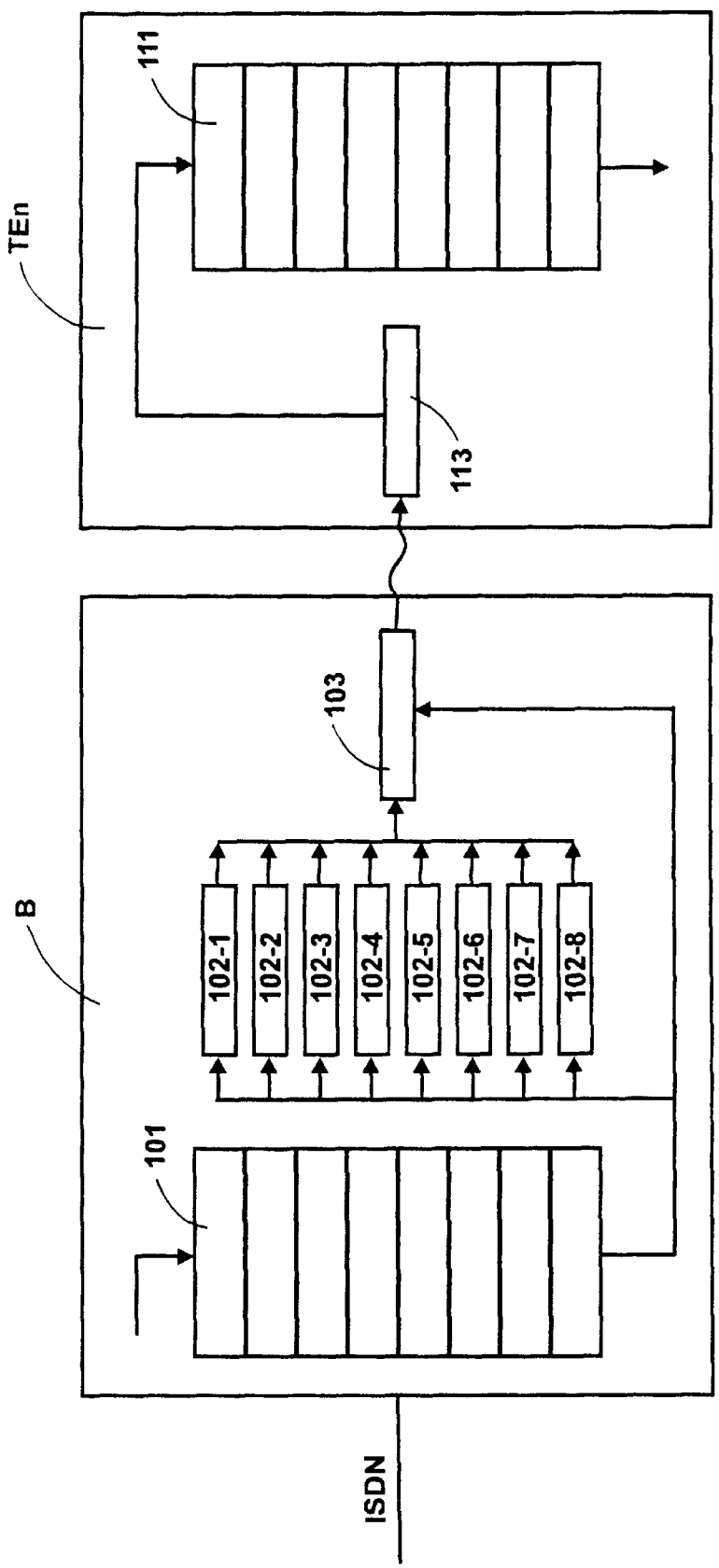
FIG. 4 is a view similar to FIG. 1 which is used to explain a normal internal structure of a base station and of a telecommunications terminal connected thereto in a radio system that operates by using the DECT Standard.

FIG. 4 shows a structure of a base station which is able to pass on wanted data received at 64 kbit/s from a telecommunications network at 64 kbit/s to an appliance connected to it (or vice versa).

It is assumed that the base station B shown in FIG. 4 is connected to the ISDN telecommunications network and receives wanted data from this network at a rate of 64 kbit/s. That data must be passed on to the telecommunications terminal TEn.

The wanted data received from the ISDN telecommunications network are stored in the base station B in a FIFO storage device 101, which can be assigned to the DLC layer. The FIFO storage device has a storage capacity of 640 bytes and is, consequently, constructed to store an amount of data which, at the desired data transmission rate of 64 kbit/s, can be transmitted by 8 DECT frames (80 ms) to the telecommunications terminal TEn.

The data written to the FIFO storage device 101 are read in units of 80 bytes, are assembled with corresponding signaling data and the already-mentioned error protection data to form a double slot, and are stored in a transmission buffer 103, which can be assigned to the MAC layer. The data packet stored in the transmission buffer 103 is dispatched from this buffer to the telecommunications terminal TEn which, in the example under consideration, acts exclusively as a receiving station. The telecommunications terminal TEn receives the data dispatched from the base station B, and first of all stores it in a receiving buffer 113 which can be assigned to the MAC layer. The data are then read from the receiving buffer, have the signaling and error protection data removed, and are stored again in a FIFO storage device 111, which can be assigned to the DLC layer. The FIFO storage device 111 contains only the wanted data contained in the transmitted double-slot data packets, and proposes such data for collection.

As in any data transmission, errors can also occur in the process which has been described above. In the example under consideration, the error rates are kept low by a combination of an ARQ (Automatic Repeat Request) approach and the already mentioned FEC (Forward Error Correction) approach. That is to say the data are checked for correctness in the receiving station using the error protection data which are also dispatched. If it is found that a transmission error has occurred, this error is either corrected in the receiving station (Forward Error Correction) or, if this is not possible, a request is made to transmit the incorrect double slot once again (Automatic Repeat Request).

In order to be able to repeat the transmission of a specific double slot, the data dispatched from the transmitting station must also be stored for a certain time after transmission. To this end, eight transmission repetition temporary storage devices 102-1 to 102-8 are provided in the example under consideration. Each of these transmission repetition buffer storage devices has a capacity of 80 bytes (90 bytes if it is also intended to be possible to correct errors occurring during transmission repetition by further transmission repetition). In other words, in each case they can store the amount of wanted data which is transmitted by one double slot. The transmission repetition buffer storage devices 102-1 to 102-8 have the data stored in the FIFO storage device 101 written to them once such data has been read, in order to be stored (prepared for dispatch) in the transmission storage device 103 (together with added signaling and error protection data).

The repetition of the transmission of a double slot, which in any case is seen over a lengthy time period, need not result in any reduction in the transmission rate of correctly transmitted data. As has already been mentioned above, specifically "only" 80 bytes of wanted data are transmitted in the "error-frees" normal case, although 90 bytes of wanted data could be transmitted. If the available capacity is fully utilized, it is thus possible to use eight double slots to transmit as much data as could be transmitted in nine normally used double slots. This means that, if it is necessary to repeat the transmission of the data contained in one double slot, this can be done without increasing the number of double slots to be transmitted. Although a brief irregularity occurs in the wanted data transmission rate, it takes just eight double slots to restore the situation which would have existed if no transmission repetition had been necessary. A transmission error which needs to be corrected by transmission repetition does not make it impossible for the delivered data to be received in the base station B without interruption and for the expected data to be received in the telecommunications terminal TEn without any interruption (from the FIFO storage device 111). The briefly fluctuating transmission rate for wanted data which is transmitted correctly may remain exterminally unnoticed, due to the buffering of the data in the base station B and the telecommunications terminal TEn.

The above-described way of transmitting data also allows correct data transmission at a high data transmission rate. In fact, as is evident from the above explanation, considerable complexity is required in order to make it possible to ensure that there are no errors in the data transmission.

The method according to the invention and the apparatus according to the invention will be described in the following text on the basis of a radio system operating by using the DECT Standard. However, the application of the invention is not limited to such use. In principle, it can be used for data transmissions carried out for any desired purpose, between any desired devices.

Apart from the details relating to data transmission, the basic structure of the DECT system under consideration does not differ from that of the system shown in FIG. 2.

Figure 3:
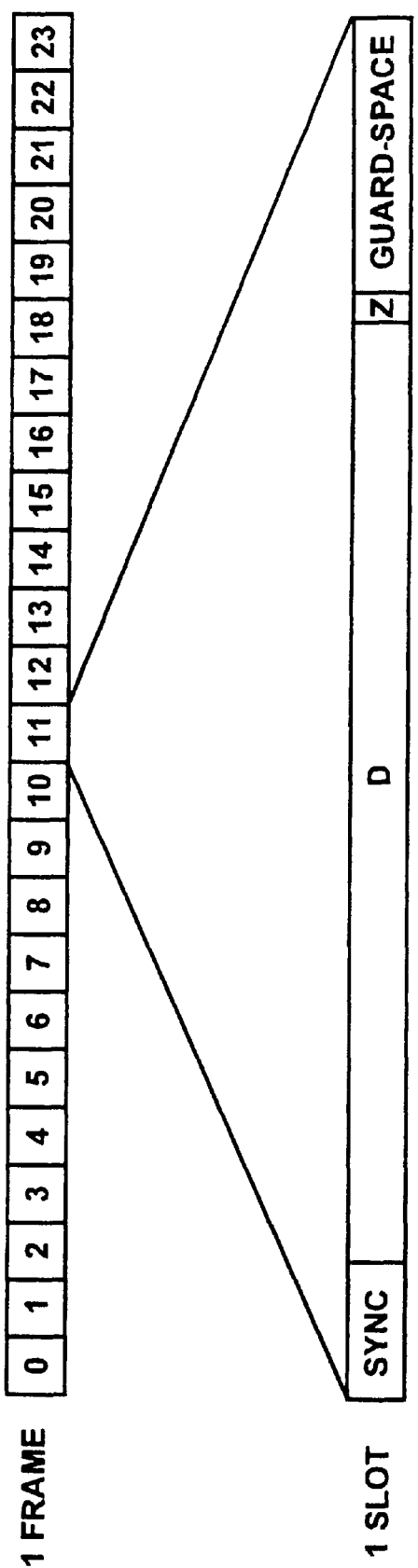
FIG. 3 is a diagram showing a format of data which are interchanged between a base station and telecommunications terminals that communicate with the base station.

Even the data format shown in FIG. 3, for the data interchanged between a base station and the mobile telephones registered with it, is essentially the same. However, double slots are transmitted instead of the full slot shown in FIG. 3, although they differ from full slots "only" in that the part of the D field of a double slot which contains the actual wanted data to be transmitted is extended by one full slot length, that is to say by 480 bits, and thus includes a total of 800 bits, of which 720 bits can be used for wanted data transmission, while 80 bits are reserved for error protection data, for carrying out FEC.

As has already been mentioned initially, it is possible when using double slots to transmit 720 bits of wanted data which are actually to be transmitted, that is to say 72 kbit/s, every 10 ms in both directions between the base station B and each of the (up to six) connected telecommunications terminals TE1, TE2, . . . TEn. In the example under consideration, it is assumed that the base station B is connected to an ISDN telecommunications network and is constructed to transmit the data for an ISDN-B channel, that is to say 64 kbit/s, to one of the telecommunications terminals, and to receive from this terminal.

Figure 1:
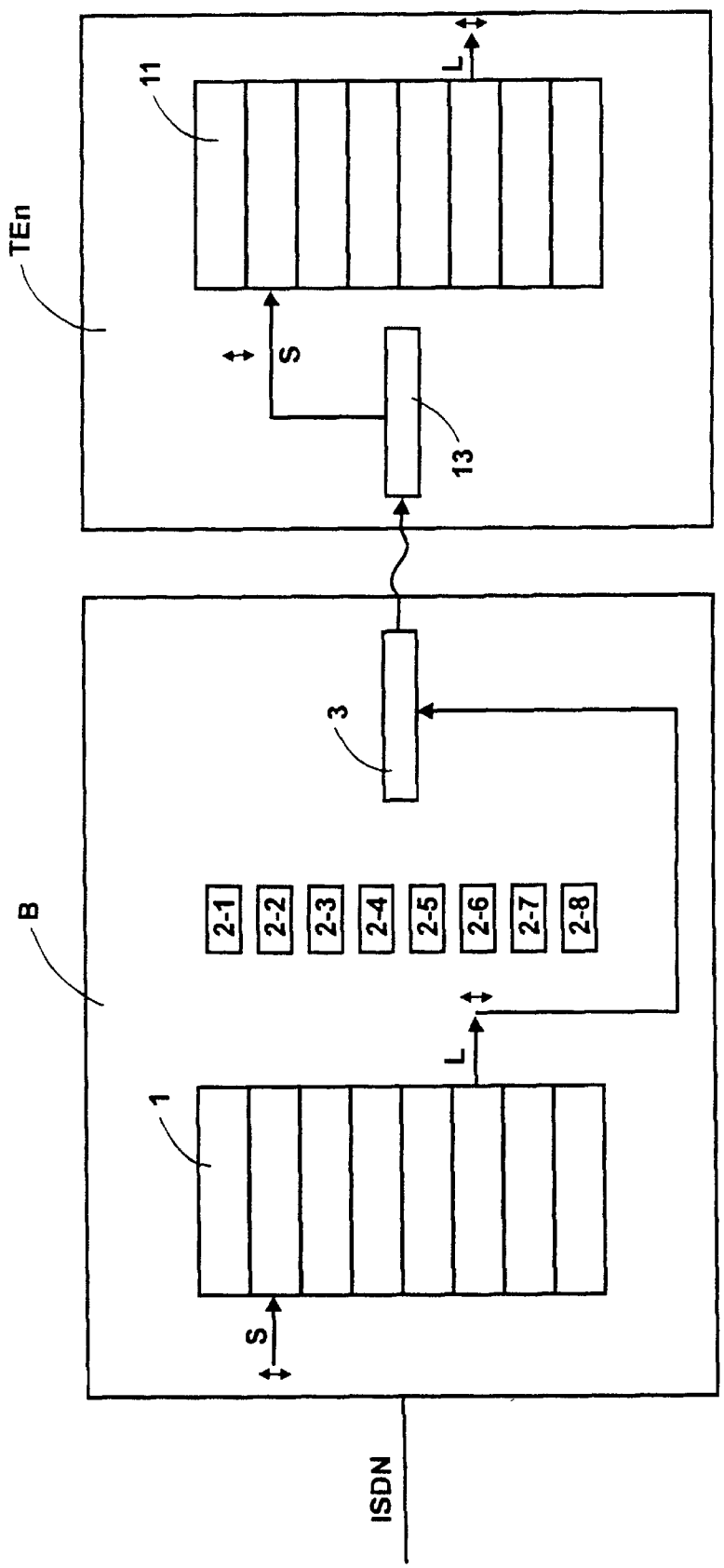
FIG. 1 is a block diagram used to explain a novel internal structure of a base station and of a telecommunications terminal connected thereto in a radio system which operates by using a DECT Standard.

FIG. 1 shows an advantageous internal structure of the base station B and of the telecommunications terminal TEn, through the use of which the fast data transmission can be carried out in a relatively simple manner, without errors.

The base station B, which in the example under consideration is assumed to be acting exclusively as a transmitting station, contains a cyclic buffer 1 that can be assigned to the DLC layer, eight read pointer temporary storage devices 2-1 to 2-8 which can likewise be assigned to the DLC layer, and a transmission buffer 3 that can be assigned to the MAC layer.

The cyclic buffer 1 is used for temporary storage of the wanted data to be transmitted to the telecommunications terminal TEn. It may be in the form of a standard RAM and, in the example under consideration, has a storage capacity of 640 bytes. As will become even more evident from the following description, the 640 bytes correspond to the amount of wanted data which can normally be transmitted to the telecommunications terminal TEn by 8 double slots within 8 DECT frames.

The cyclic buffer 1 has an associated write pointer S, and a read pointer L, which is independent thereof. The pointers are automatically incremented whenever data are written or read, and automatically jump back to the start of the storage device, like a type of so-called modular counter, upon reaching the end of the storage device (or vice versa). However, the write pointer S and the read pointer L can also be moved as an extraordinary measure at any time to any desired points within the cyclic buffer.

The read pointer temporary storage devices 2-1 to 2-8 are used for temporary storage of addresses at which wanted data, that are normally to be transmitted by a respective double slot, are stored in the cyclic buffer. The number of such pointers is equal to the number of frames or double slots which are normally required to transmit the amount of data that can be stored in the cyclic buffer 1.

The transmission buffer 3 is used to prepare for the transmission in the double-slot format of the data to be transmitted together with signaling and error protection data.

The telecommunications terminal TEn which, in the example under consideration, is assumed to act exclusively as a receiving station, contains a receiving buffer 13 which can be assigned to the MAC layer, and a cyclic buffer 11 which can be assigned to the DLC layer.

The cyclic buffer 11 is used for temporary storage of the wanted data received from the base station B, and otherwise corresponds to the cyclic buffer 1.

The receiving buffer 13 is used as an input buffer for the double slots received from the base station.

As has already been mentioned above, the base station B is connected to the ISDN telecommunications network, which is denoted by reference symbol ISDN in FIG. 1. The wanted data received through one of the B-channels are extracted from the data received through the ISDN telecommunications network, are converted into a continuous data stream (64 kbit/s) and (with the write pointer S being incremented continuously) are written to the cyclic buffer 1. Once a specific amount of data has been written to the cyclic buffer 1, the process of reading the stored data starts (with the read pointer L being incremented continuously), in order to transmit the data, together with attached signaling and error protection data, in double slots to the telecommunications terminal TEn. The data are read from the cyclic buffer 1 in units of 80 bytes (640 bits). The 80 bytes of wanted data that have been read are assembled with the signaling and error protection data to form a data packet which includes a total of 960 bits, is in the double-slot format and is stored in the transmission buffer 3. From there, the data packet is transmitted as a double slot to the telecommunications terminal TEn. The telecommunications terminal TEn receives the double slot and, first of all, stores it in the receiving buffer 13. It then reads the data stored in the receiving buffer 13, removes the signaling and error protection data from it, and stores the wanted data in the cyclic buffer 11. Once the predetermined amount of data has been written to the cyclic buffer 11, it is then possible to start to read data from this buffer continuously at a rate of 64 kbit/s.

In the above explanations of the processes which take place in the system shown in FIG. 1, it has been assumed that the data transmission from the base station B to the telecommunications terminal TEn took place without any errors or only with errors which can be corrected in the telecommunications terminal TEn using the error protection data that are also transmitted.

However, the data received by the telecommunications terminal TEn are subjected before they are used to a check which uses the error protection data that are also transmitted to check whether or not the relevant double slot has been transmitted without any errors. In the process, if it is found that the transmission did not take place without any errors, then the telecommunications terminal TEn attempts to correct the error using the error protection data. If the error cannot be corrected, the double slot must be transmitted once again. As has already been mentioned initially, this error reduction method, which is practiced in the LU7 service under consideration, is a combination of an ARQ and an FEC approach.

The base station B continuously monitors whether or not there is any need to repeat the transmission of the double slot.

This can be identified from the lack of confirmation of receipt of the relevant double slot by the telecommunications terminal TEn and/or by an appropriate specific request from the telecommunications terminal TEn.

If the base station finds that a specific double slot needs to be transmitted once again, then it transmits the relevant double slot once again. However, in contrast to the situation with error-free transmission, not just 80 bytes, but the maximum possible 90 bytes of wanted data are temporarily transmitted (for eight double slots). This allows 1.125 times the amount of wanted data which is normally transmitted (in error-free operation) per double slot to be transmitted per double slot. This means that, after the eight fully used double slots have been transmitted, the amount of data which has been transmitted, despite the repeated transmission of one double slot, is the same as would have been transmitted if no transmission error had occurred and the double slots had been used normally (only partially).

In the situation where it is necessary to repeat the transmission of specific data, the read pointer L of the cyclic buffer 1 can no longer be incremented singularly in the normal way in order to allow the desired data to be read. Since the data which need to be repeated have already been read from the cyclic buffer once, the read pointer L must be reset.

In the example under consideration, this is done by using the read pointer temporary storage device 2-1 to 2-8. The read pointer temporary storage devices 2-1 to 2-8 store the respective addresses at which the data to be transmitted by a double slot are stored in the cyclic buffer.

If the base station now has to transmit specific data once again, then the read pointer L is moved in accordance with the entry in the associated read pointer temporary storage device, after which the desired data can be read from the cyclic buffer 1 as normal. There is no need to provide any separate transmission repetition temporary storage device (102-1 to 102-8 in FIG. 4). All that is necessary is to take account of the fact that the write pointer S in each case is so far away from the read pointer L that the data to be read once again from the cyclic buffer and the data which has not yet been read are not actually overwritten before it has been possible to read them.

The read pointer temporary storage devices 2-1 to 2-8 must, of course, be updated as required.

The provision of the read pointer temporary storage devices 2-1 to 2-8 can be dispensed with if the cyclic buffer 1 is always written to in such a way that the addresses stored in the read pointer temporary storage devices 2-1 to 2-8 can be calculated easily, do not change, or change only in the known manner.

Irrespective of this, the structure and the operation of a data transmission system constructed as described are considerably simpler than if a FIFO storage device were to be used as the wanted data temporary storage device.

In particular, as has already been explained above, it is possible to dispense with the provision of a separate transmission repetition temporary storage device when a cyclic buffer is used instead of the FIFO storage device. Furthermore, there is also no need for the continuous restorage or further shifting of the data stored therein, as is required with FIFO storage devices.

The above-described data transmission system occupies a small amount of space, consumes less power and is not heated so severely.

The above-described method and the above-described apparatus thus allow the complexity which must be accepted in order to be able to ensure that the data transmission is free of errors, to be reduced to a minimum.

I claim:

1. In a method for transmitting a continuous data stream in packetized form using a storage device for temporarily storing the data for specific times before and after transmission of the data, the improvement which comprises:

temporarily storing data of data packets in a cyclic buffer;

temporarily storing addresses of the data packets stored in the cyclic buffer in a read-pointer temporary storage device;

retrieving the data packets from the cyclic buffer and transmitting the data packets; and retrieving data packets which were transmitted with errors from the cyclic buffer and re-transmitting the data packets which were transmitted with errors by using the temporarily stored addresses of the data packets in the read-pointer temporary storage.

2. The method according to claim 1, which comprises reading the data to be transmitted from the cyclic buffer immediately before transmission of the data, and preparing the data for transmission together with signaling and error protection data in a transmission buffer.

3. The method according to claim 1, which comprises supplying a start address, from which the data to be transmitted can be read from the cyclic buffer, from a read-pointer temporary storage device, at least when the data are transmitted once again.

4. An apparatus for transmitting a continuous data stream in packetized form, comprising:

a storage device for temporarily storing data in data packets for specific times before and after transmission of the data, said storage device containing a cyclic buffer;

a multiplicity of read-pointer temporary storage devices for storing addresses of said data packets stored in the cyclic buffer; and a transmission device for transmitting said data packets and re-transmitting data packets previously transmitted with errors, said re-transmitted data packets being retrieved from the cyclic buffer by using said temporarily stored addresses of said data packets in said read-pointer temporary storage devices.

* * * * *